United States Patent [19]

Dellecker et al.

[11] 3,723,661

[45] Mar. 27, 1973

[54] MULTIFUNCTIONAL SCANNER-COUNTER CIRCUIT

[75] Inventors: Raymond Whyte Dellecker, Denver; William Wallace Greason, III, Longmont, both of Colo.; Paul Ross Hayden, Marina Del Ray, Calif.; David William Weiner, Boulder, Colo.

[73] Assignee: Bell Telephone Laboratories, Incorporated, Murray Hill, Berkeley Heights, N.J.

[22] Filed: Apr. 26, 1971

[21] Appl. No.: 137,150

[52] U.S. Cl. ..........179/18 FG

[51] Int. Cl. ..........H04q 3/42

[58] Field of Search ..........179/18 FF, 18 FG, 18 FH, 18 EB, 179/18 E

[56] References Cited

UNITED STATES PATENTS 3,377,432 4/1968 Abbott et al. ..........179/18 FH

FOREIGN PATENTS OR APPLICATIONS 1,057,218 2/1967 Great Britain..........179/18 FG

*Primary Examiner*—Thomas W. Brown
*Attorney*—R. J. Guenther and James W. Falk

[57] ABSTRACT

This specification discloses a telephone system suitable for use as a private branch exchange and includes a switching network for establishing call connections between station line circuits, trunks and registers under electronic common control. Each register comprises control circuitry for switching a multifunctional counter circuit into a plurality of configurations on a single call for initially scanning stations to detect call service requests, then counting dialed pulses transmitted from a calling station, and subsequently scanning stations on a callback operation to identify the calling station.

6 Claims, 12 Drawing Figures

INVENTORS R.W. DELLECKER
W.W. GREASON III
P.R. HAYDEN
D.W. WEINER
BY Frederick W. Padden
ATTORNEY

FIG. 2 TENS COUNTER SCANNER

ON-OFF HOOK DETECTOR CIRCUIT

FIG. 10
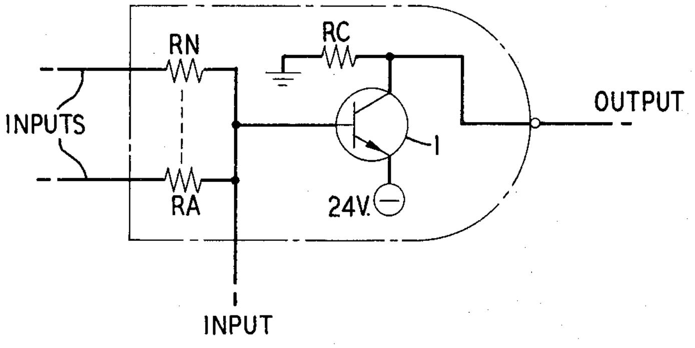
FIG. 11
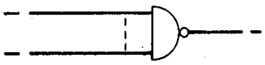
FIG. 12
| | | | |
|---|---|---|---|
| FIG. 2 | FIG. 4 | FIG. 6 | FIG. 8 |
| FIG. 3 | FIG. 5 | FIG. 7 | FIG. 9 |

MULTIFUNCTIONAL SCANNER-COUNTER CIRCUIT

BACKGROUND OF THE INVENTION

This invention relates to communication systems and particularly to multifunctional counter and control circuitry for scanning and pulse counting operations in telephone systems.

New and imaginative innovations are continually introduced by telephone companies to fulfill customer needs for quality service at reasonable cost. Among the recent innovations has been the development of small electronic switching systems, such as private branch exchanges, for serving customers desiring only basic automatic switching of local outgoing and intercom calls without sophisticated adjunct special services that tend to contribute to higher service cost.

A fundamental procedure in the latter systems is the use of station line scanning for detecting customer requests for service. It generally involves the generation of coded pulses which address customer lines for detecting service requests signified by telephone off-hook conditions. When such a request is detected, the telephone system customarily connects a customer dial pulse register to the calling telephone for returning dial tone and subsequently counting and registering dial pulses corresponding to a called number. After the number registration, the system often initiates other circuit actions to callback the calling telephone for obtaining its address identity incident to the completion of call connections.

A problem heretofore existent in such systems has proven to be that relatively complex and costly individual circuits have heretofore been needed (1) for generating the service request line scanning codes, (2) for counting and registering dialed pulses of a called number, and (3) for generating callback line scanning pulses to obtain the calling station identity.

SUMMARY OF THE INVENTION

In accordance with principles of our invention, a solution to the foregoing problem is achieved by providing control circuitry which reuses a single multifunctional counter circuit on each call for scanning station lines for service requests, then counting and registering a dialed called number, and thereafter for callback scanning of the calling station to identify it before the completion of connections to the called station. The reuse of the single counter for a plurality of service functions reduces the cost and complexity of circuits and related equipments as well as the space requirements for the switching system.

The counter circuit is illustratively integrated into a register of a private branch exchange which has a plurality of customer stations identified by two digit numbers. Accordingly, it comprises "tens" and "units" counter stages which are operated by a register state control circuit and a steering control circuit to perform the scanning and dial pulse counting functions. When the register is idle and not engaged on a call, the register state control circuit causes the "units" and "tens" counters to be driven by clock pulses for generating address codes which are supplied to a common control circuit for scanning the station lines for service requests.

Upon a detection of a service request, the common control circuit activates the register state control circuit for interrupting clock pulse driving of the counters and stopping scanning at the calling station line. Next, the common control establishes connections through a crossbar switching network between the calling station and the register and then releases itself from the call connections in order to serve other calls. Concurrently, the register control circuit is activated to initiate a resetting of the "tens" and "units" counters and to switch the register steering circuit into a steer "tens" state whereby a first digit dialed by the calling party is subsequently counted and registered in the "tens" counter. Following the establishment of the call connections, dial tone is returned to the calling station as a signal to commence dialing.

The register is further equipped with a dial pulse detector circuit which repeats each digit pulse dialed over the established connections and controls the disconnection of dial tone upon the receipt of the first pulse. Each repeated pulse of the first digit is counted and registered by the "tens" counter. Following such registration, a pulse train detector in the register activates the steering circuit to advance it to a steer "units" state in which a next dialed digit is directed to the "units" counter.

Certain codes in the illustrative system comprise a single digit and are used, for example, on dial "0" calls to an operator. Accordingly, when the register enters the steer "units" state, a single digit detector checks the output of the "tens" counter to ascertain if the registered first digit corresponds to a single digit code. Upon detecting such a code, the detector immediately informs the common control circuit thereof and activates the steering circuit to advance the register into a dialing completed state.

On the other hand, when a single digit code is not detected, each of the repeated pulses of a second dialed digit is counted and registered by the "units" counter. Thereafter, the pulse train detector again activates the steering circuit to advance the register into a dialing completed state. The register next checks the availability of the common control circuit and, if idle, engages it for reading out the registered code from the "units" and "tens" counters. The readout code is used by the common control circuit to select an idle trunk circuit for completing call connections.

At this stage of the call, the calling station remains connected to the register and the common control circuit has no information as to the address identity of the calling station. To identify it, the common control operates the register state control circuit to initiate a callback operation by again driving the "tens" and "units" counters to generate callback line scanning codes. Concurrently, the register state control circuit causes a callback potential to be sent back via the switching network to the calling station line circuit to mark it for identification. The common control again utilizes the generated scanning codes for line scanning and identifying the marked line circuit. When the identification is completed, clock pulse driving of the counters is stopped and the register call connections through the network are released. After the common control establishes the connection between the called back line circuit and the selected trunk circuit, then the register proceeds to recycle its state control and steering circuits into an idle state for enabling the "units" and "tens" counters to resume the generation of station address codes for service request scanning.

DESCRIPTION OF THE DRAWING

The foregoing and other objects and features of this invention will become apparent from a reading of the following description of an illustrative embodiment of our invention taken in conjunction with the drawing in which:

FIGS. 10 and 11 illustrate the basic transistor-resistor logic circuit that is utilized as a gate in the register of FIGS. 2 through 9;

FIG. 12 illustrates the manner in which the FIGS. 2 through 9 may be arranged to show the cooperation and operation of the circuitries in those figures.

The transistor-resistor logic circuit depicted in FIG. 10 and symbolically in FIG. 11 comprises a single NPN transistor 1, a collector resistor RC and a plurality of input resistors RA–RN of which there is one for each input to the stage. The circuit of FIG. 10 is basically a single-stage inverter since a positive signal hereinafter referred to as a HIGH applied to the base appears as a negative signal hereinafter referred to as a LOW at the collector and vice versa.

The stage may be used as an inverting OR gate leaving the circuit normally "OFF," that is, with all inputs LOW (minus 24 volts). In this case, a HIGH signal applied to one or more of the input leads will turn the transistor "ON" and provide a LOW signal at its collector. The stage may also be used as an inverting AND gate in which case the transistor is normally held "ON" by a HIGH signal applied to one or more of its input leads. The "OFF" condition of the circuit is achieved by a LOW potential on all input leads at the same time. As a result, the transistor produces a HIGH signal at its output.

Figure 1:
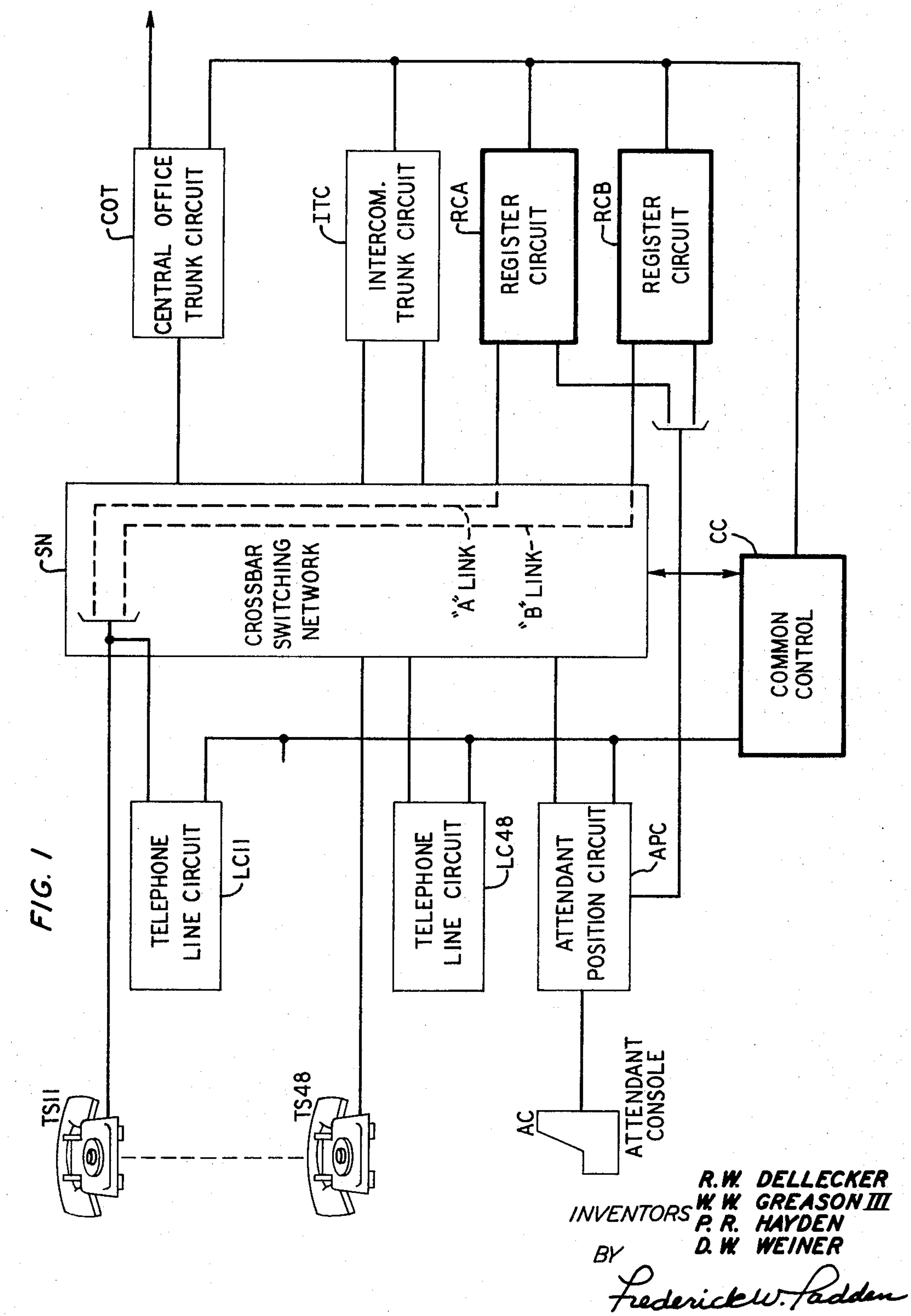
FIG. 1 comprises a block diagram of a telephone system comprising the present invention.

It is noted that the invention is particularly concerned with the structural details of the register circuit and its function cooperation with the common control circuit shown in the heavy line block of FIG. 1. The detailed design of the other circuit units form no part of the present invention and are therefore neither shown nor described in detail herein except where necessary for a complete understanding of the invention. For example, the switching network is illustratively a conventional six-wire crossbar switch network and the telephone line circuit may be of the design disclosed in the patent applications of W. W. Greason III and D. W. Weiner entitled Line Hunting Circuitry, Ser. No. 100,315 filed Dec. 21, 1970, now U.S. Pat. No. 3,697,700, and Communication Line Circuitry, Ser. No. 100,314 filed Dec. 21, 1970, now U.S. Pat. No. 3,697,701.

GENERAL DESCRIPTION

The telephone system as disclosed in FIG. 1 is particularly suitable for use as a small private branch exchange which includes a plurality of telephone stations TS11–TS48, each of which is connected to a correspondingly numbered one of the line circuits LC11–LC48 via a switching network SN. Each of the line circuits is additionally connected to a common control circuit CC. Network SN provides "A" and "B" links for call connections and also terminates a number of trunk circuits such as central office trunk circuit COT, intercom trunk circuit ITC and registers RCA and RCB, and an attendant position circuit APC to an attendant console AC. The common control circuit CC regulates and coordinates the operation of every circuit in the system during the serving of calls. Accordingly, it is connected to the line circuit, switching network, registers and the various trunk circuits.

Each of the registers RCA and RCB is equipped with counter-scanner circuitry which, according to our invention, operates under control of the common control circuit CC to generate line scanning signals during the time that call service is not in progress. The generated line scanning signals are supplied to the common control CC for interrogating each of the line circuits LC11–LC48 for call service request.

A call is initiated in a conventional manner when a calling party lifts the handset of his station preparatory to dialing digits of a called number. The off-hook condition is detected by the common control CC during the scanning action. The common control, in scanning, has selected an idle one of the two registers RCA and RCB and then identifies the calling line. Next, the control circuit CC marks both ends of the switching network SN so that it completes a path between the calling line circuit and the selected register and then becomes idle.

Once this connection is established, the register returns dial tone to the calling line and the customer proceeds to dial the digits for the called number into the selected register. Upon the initiation of dialing, the counter-scanner circuitry, in accordance with our invention, is effective to switch from a line scanning pulse generating mode to a dial pulse counting mode for registering all of the called station digits transmitted from the calling station. The register bids for an idle common control upon the completion of digit registration and then transmits the dialed number to that circuit. The common control CC next selects an idle trunk circuit, that is either an intercom or a central office circuit ITC or COT, and marks the SN network termination of the selected trunk.

At this stage of the call, the calling line circuit remains connected to the register and the common control circuit has no information as to the identity of the calling line. To obtain such identity, the common control circuit commands the register to initiate a callback operation by sending a callback potential to the calling line circuit through the network SN and then initiating a scanning operation which identifies the calling line circuit. In accordance with another aspect of our invention, the common control CC directs the register to reuse its counter-scanner circuitry for generating callback line scanning signals. Control circuit CC stops the callback line-scanning operation when the calling line has been found and then instructs the register to release its connections through network SN to the calling line circuit for removing the callback voltage from the network connections. The control circuit CC then marks the network termination of a calling line circuit and a network termination of the selected trunk circuit for establishing call connection between the calling line circuit and the selected trunk for further call processing in a conventional manner.

DETAILED DESCRIPTION

Turning now to FIGS. 2 through 9, the specific illustrative structure and operation of one of the two registers, RCA and RCB, is described. Each of the registers comprises essentially the same structural elements and modes of operation. Accordingly, for convenience of this description it is assumed that FIGS. 2 through 9 refer to register RCA.

Before describing the switching states of various gates in register RCA as controlled by circuit CC, it is beneficial to review that the output of an OFF gate is referred to as "HIGH" and illustratively is several volts above, for example, –24 volts. In a similar fashion, the output of an ON gate is referred to as "LOW" and is illustratively –24 volts. An asterisk symbol is used with certain of the input and output lead designations to indicate a HIGH thereon during the idle condition of the register. All of the other leads concurrently have a LOW thereon.

Figure 2:
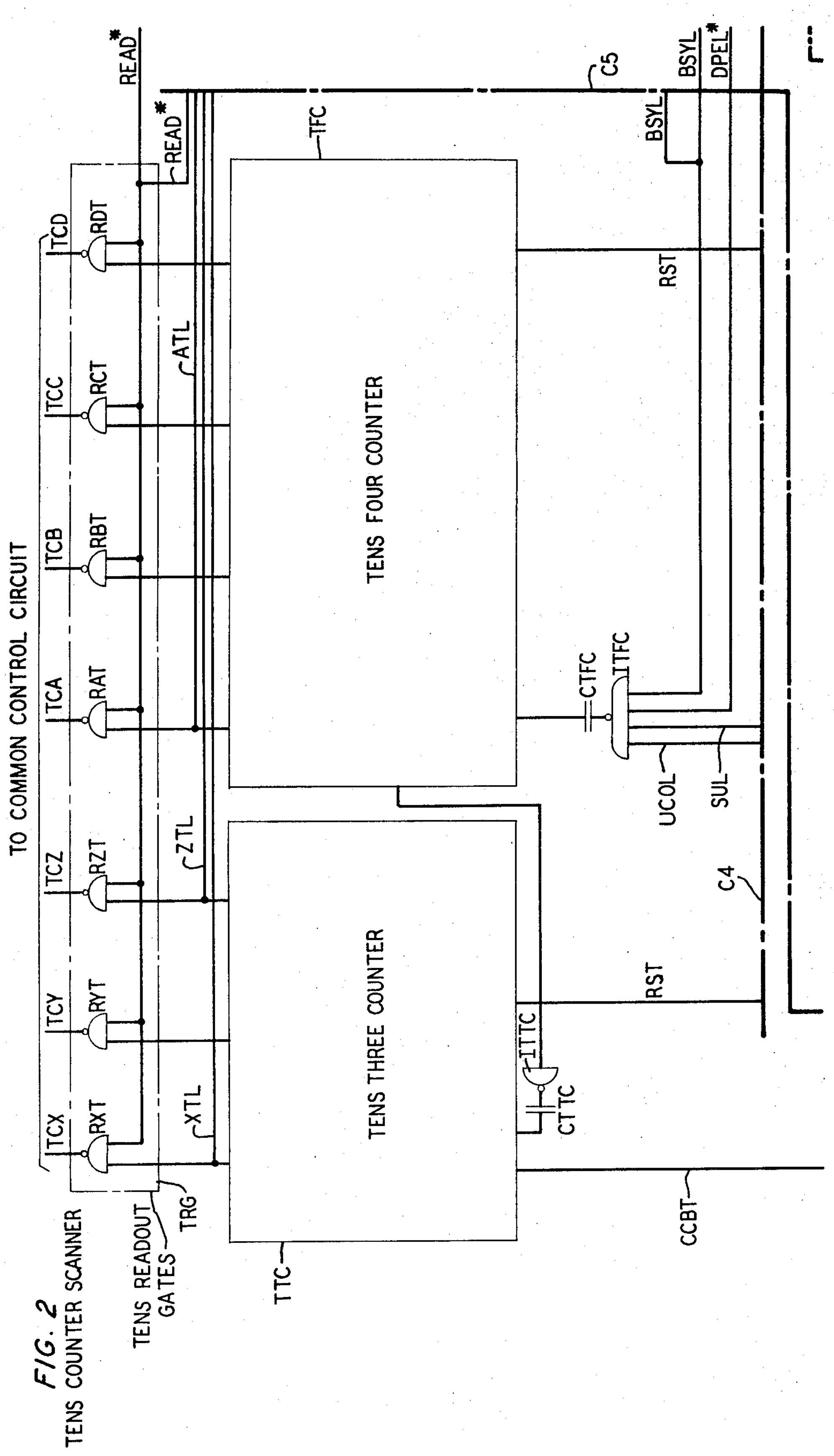
FIGS. 2 and 4 are schematic drawings of the "tens" and "units" counter-scanner circuits.
Figure 4:
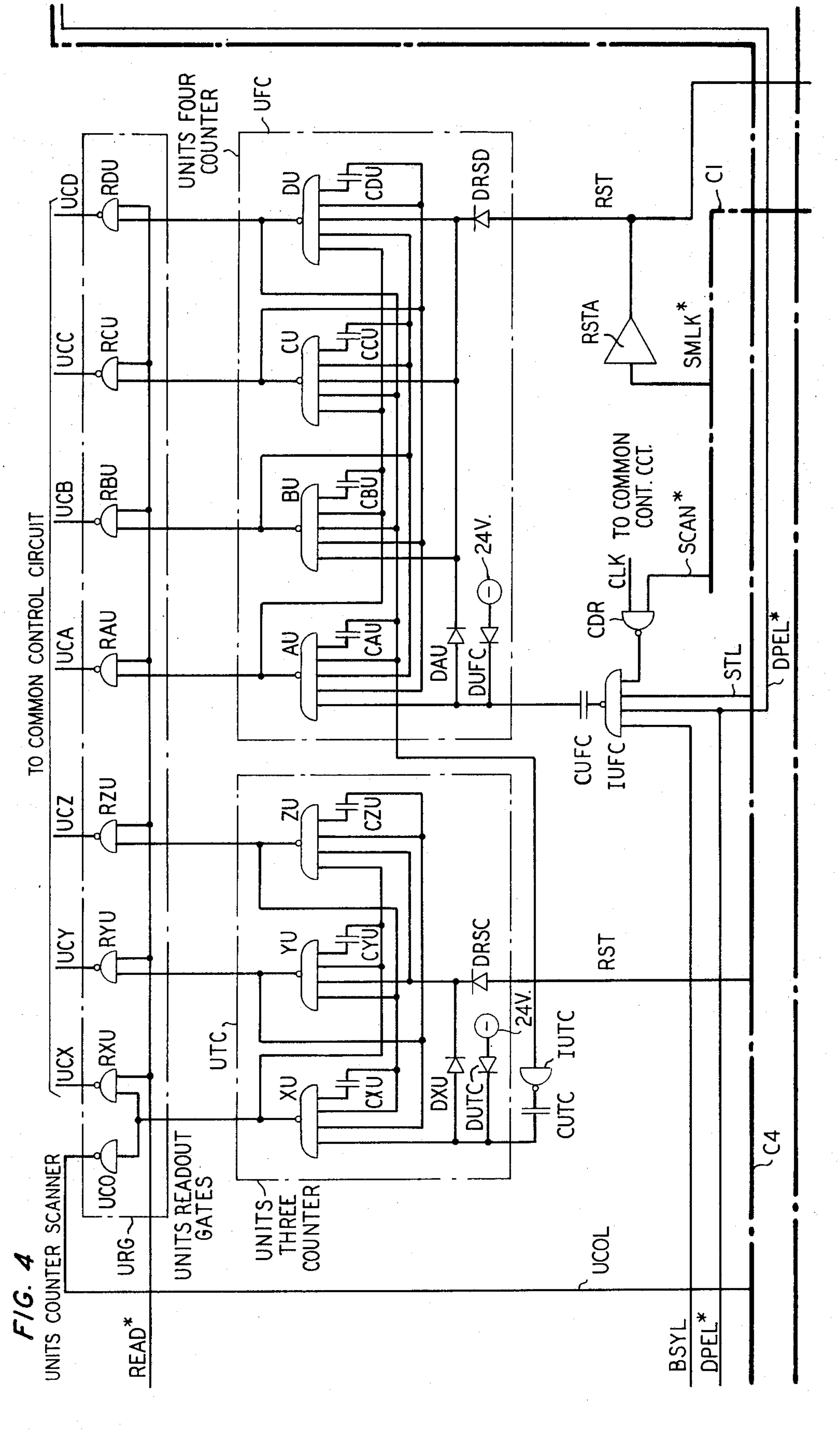

FIGS. 2 and 4 discloses the "tens" and "units" counter-scanner circuitry which is configured under control of signals from the common control circuit CC for generating line scanning pulses, for subsequently registering dialed digits and for generating pulses for callback line scanning. In accordance with the exemplary embodiment of our invention, essentially identical circuits are used for the "tens" and "units" circuits. Therefore, the schematic details of the "units" counter-scanner are shown only in FIG. 4. FIG. 2 shows the block diagram of the "tens" counter-scanner. The control circuitry interconnecting it with the "units" circuitry of FIGS. 2 and 4 is configured as a ring counter having 144 states. The "units" and "tens" counter-scanners each comprise 12 state ring counters including a four-stage counter driven by clock pulses or dial pulses and a three-stage counter driven by the four-stage counter. Specifically, a "units" four counter UFC of FIG. 4 is driven by received clock pulses or dial pulses and every fourth such pulse counted by counter UFC advances by one-count state a "units" three counter UTC of FIG. 4. A "tens" four counter TFC of FIG. 2 is substantially identical circuitwise to the "units" counter UFC. Counter TFC is advanced one count state for every third pulse counted by the "units" counter UTC of FIG. 4. A "tens" three counter TTC of FIG. 2 is substantially identical circuitwise to the "units" counter UTC. Counter TTC is advanced one count state for every fourth pulse counted by the "tens" counter TFC. Thus, a complete counting style for the counter circuitry of FIGS. 2 and 4 occurs every 144 clock pulses.

For service request and callback line scanning as later explained, the counter-scanner circuits of FIGS. 2 and 4 are operated under control of clock pulses supplied by the common control circuit CC via a clock driver gate CDR and an input "units" four counter gate IUFC of FIG. 4. On dial pulse counting operations, the "tens" counter-scanner is operated for counting a dialed "tens" digit under control of an input "tens" four counter gate ITFC of FIG. 2. "Units" digit counting is accomplished by the "units" counter-scanner under control of gate IUFC of FIG. 4. A digit steering circuit of FIG. 8 steers dialed "tens" and "units" digits to the appropriate counter-scanner by supplying control signals to the input steer "tens" and "units" leads STL and SUL of gates ITFC and IUFC of FIGS. 4 and 2.

Figure 5:
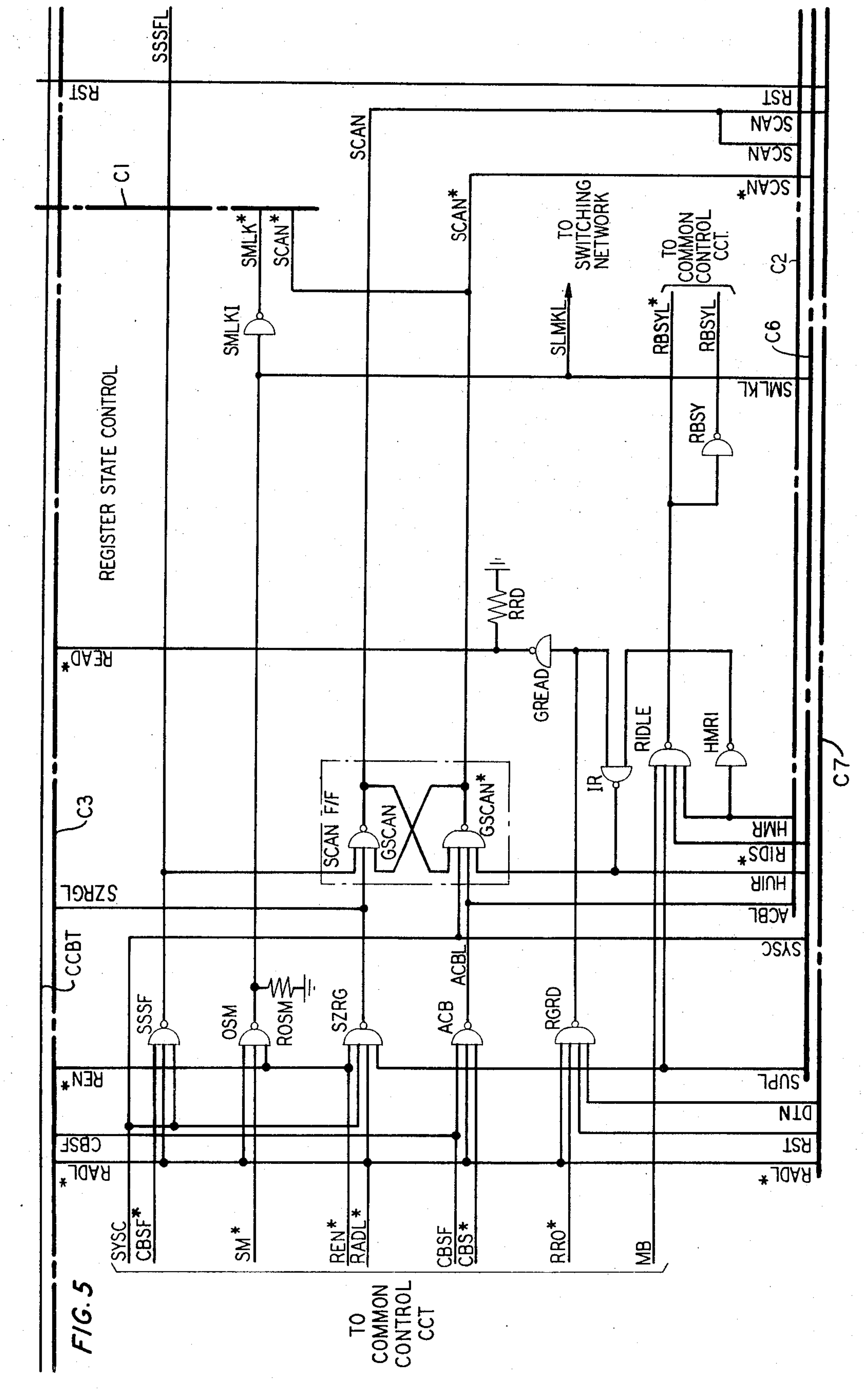
FIG. 5 shows the register state control circuitry of the illustrative register circuit.

An understanding of the principles of the detailed structure and operation of our exemplary embodiment may be understood by describing the processing of a call. At the time the system is initially placed in service, the counter-scanners of FIGS. 2 and 4 are activated to commence service request line scanning in response to a system clear signal received from the common control circuit CC. The latter signal is a HIGH applied to a lead SYSC at the upper left of FIG. 5 for switching ON a gate GSCAN* of a flip-flop SCAN F/F. A LOW output from gate GSCAN* is then applied to lead SCAN* via cable Cl into FIG. 4 for enabling the clock driver gate CDR to commence driving the "units" and "tens" counter-scanners in response to clock pulses from the common control circuit CC. The HIGH on lead SYSC is further used by the register for inhibiting other control functions such as busy tone, dial tone and class-of-service treatment operations. Specifically, the HIGH on lead SYSC forward-biases a diode DSYSC of FIG. 8 to turn ON a steer "tens" gate ST, steer "units" gate SU and a dialing completed gate COMP for placing the steering circuit of FIG. 8 into an idle scan state. When gates ST and SU switch ON, LOW output signals are coupled over leads STL and SUL for enabling gates ITFC and IUFC and thereby conditioning the counter-scanners for line scanner pulse generation. Concurrently, a register idle scan gate RIDS of FIG. 8 is switched OFF by the LOWS from gates ST, SU, and COMP of FIG. 8. In turn, gate RIDS supplies a signal for holding the gates ST, SU and COMP ON. In FIG. 5, the HIGH on lead SYSC also turns ON a stop scanning station found gate SSSF and a seizure register gate SZRG the outputs of which then combine with the output of gate GSCAN* to switch gate GSCAN OFF. A resultant HIGH signal from the latter gate is applied over lead SCAN of cable C7 into FIG. 7 to maintain a dial tone flip-flop DT F/F and busy tone BT F/F reset for blocking dial and busy tone operations while maintaining a LOW on lead BSYL of cable C3 to gates ITFC and IUFC of FIGS. 4 and 2. The register is now conditioned for generating line scanning signals.

For equipment economy, the "units" and "tens" counter-scanners of FIGS. 2 and 4 each comprise three and four-stage counters for generating a maximum of 12 (3 × 4) states for a respective "units" digit and 12 states for a "tens" digit. In FIG. 4, the four-state "units" four counter UFC comprises the gates AU–DU which are driven by clock pulses applied from the control circuit CC via a clock driver gate CDR and an input "units" four counter gate IUFC. A stable state of circuit UFC consists of one of the AU–DU gate outputs being HIGH which feeds back to hold all of the other gates of counter UFC in the chain LOW. To illustrate the operation of circuit UFC, assume that gate AU is initially OFF (output HIGH) and that gates BU, CU and DU are ON (outputs LOW). This results in capacitor CBU being charged to a voltage determined by the collector resistance of gate AU and the resistance driven by gate AU. Upon a receipt of a next clock pulse from the clock driver gate CDR, gate IUFC is switched HIGH and capacitor CUFC allows a short positive-going pulse to appear at an input of each gate in the chain. All gates AU–DU in the chain then turn ON momentarily, but when the pulse is terminated these gates attempt to turn OFF. Since capacitor CBU is priorly charged, gate AU turned ON causes the capacitor voltage at the input of gate BU to go a few volts below −24 volts. The time duration of the input pulse is shorter than the charging time of capacitor CBU such that the input voltage to gate BU is slightly below −24 volts when the input pulse is terminated. As a result, gate BU turns OFF before gates AU, CU and DU and thereupon holds the latter gates ON. Capacitor CCU is now charged in a manner as described with respect to capacitor CBU and the counter has advanced one state. Each time that a subsequent clock pulse is coupled from the clock driver gate CDR and gate IUFC, counter UFC advances one state. Diode DAU couples input clock pulses from capacitor CUFC to the inputs of gates BU, CU and DU and blocks reset pulses from being applied to gate AU on a reset operation as hereinafter described. Diode DUFC prevents large negative transient voltages from reaching the inputs of gates AU–DU when gate IUFC turns ON in response to a clock pulse.

The "units" three counter UTC is driven by HIGH to LOW output pulses from gate DU. Thus, counter UTC is advanced one state once every four clock pulses. Counter UTC illustratively commences line-scanning pulse operations with gate XU OFF and gates UY and ZU ON. Accordingly, capacitor CYU is charged to a voltage determined by a collector resistor of gate XU and the resistance driven by gate XU. When an output LOW is generated by gate DU, it is inverted by gate IUTC to couple a short duration positive pulse through capacitor CUTC to the input of gate XU and via diode DXU to the input of gates YU and ZU. All gates XU–ZU turn ON momentarily, but when the pulse is terminated, they attempt to turn OFF. Since capacitor CYU has already been charged, gate XU turning ON causes the capacitor voltage at the input of gate YU to go a few volts below −24 volts. The time duration of the input pulse is shorter than the charging time of capacitor CYU, such that the voltage input to gate YU will be slightly below −24 volts when the input pulse terminates. This results in gate YU turning OFF first and holding gates XU and ZU ON. Capacitor CZU then is charged in much the same manner as capacitor CYU and counter UTC has been advanced one stage. The advance of counter UTC into the next counter state is essentially the same as described for gate YU and is effected when gate DU switches its output from HIGH to LOW. Thus, the four-state counter (gates AU–DU) and the three-state counter (gates XU–ZU) form a 12-state "units" portion of a counter-scanner circuit.

The operation of the "tens" four and three counters TFC and TTC of FIG. 2 for generating scanning pulses is essentially the same as that of the counters UFC and UTC of FIG. 4. Pulse drive for counter TFC is provided by the output of gate XU of FIG. 4 via gate UCO of FIG. 4, lead UCOL of cable C4 into FIG. 2 and the input "tens" four counter gate ITFC of FIG. 2. The latter gate circuitwise performs the same function for counter TFC as gate IUFC performs for counter UFC of FIG. 4. Accordingly, each 12th clock pulse causes gate XU of FIG. 2 to advance the counter TFC one count state. Similarly, each fourth pulse advance by counter TFC advances by one count state the counter TTC.

The following tabulation shows the output "units" and "tens" digit translation corresponding to the 12 states of the "units" counter-scanner of FIG. 4 and the 12 states of the "tens" counter-scanner of FIG. 2. In the tabulation, the "tens" gates AT–DT (not shown in detail) of counter TFC of FIG. 2 correspond to the gates AU–DU of counter UFC of FIG. 4. Similarly, gates XT–ZT of counter TTC of FIG. 2 correspond to gates XU–ZU of FIG. 4.

| Translated State or Digit | State of Units and Tens Counter-Scanner Gates (H=high, L=low) | | | | | | |
|---|---|---|---|---|---|---|---|
| (Units) | AU | BU | CU | DU | XU | YU | ZU |
| (Tens) | AT | BT | CT | DT | XT | YT | ZT |
| a | H | L | L | L | H | L | L |
| 1 | L | H | L | L | H | L | L |
| 2 | L | L | H | L | H | L | L |
| 3 | L | L | L | H | H | L | L |
| 4 | H | L | L | L | L | H | L |
| 5 | L | H | L | L | L | H | L |
| 6 | L | L | H | L | L | H | L |
| 7 | L | L | L | H | L | H | L |
| 8 | H | L | L | L | L | L | H |
| 9 | L | H | L | L | L | L | L |
| 0 | L | L | H | L | L | L | H |
| b | L | L | L | H | L | L | H |

Counter-Scanner Readout

A readout of the line scanner pulses generated by the "units" and "tens" counter-scanners is effected by the control circuit CC causing the enabling of the readout gates RXU, RYU, RZU, RAU, RBU, RCU, RDU, RXT, RYT, RZT, RAT, RBT, RCT and RDT of FIGS. 2 and 4 by a LOW signal on the common input lead READ*. With these gates enabled, the register passes the "units" and "tens" counter contents to the common control on leads UCX through UCD and TCX through TCD. Control circuit CC initiates the readout by operating the register state control circuitry of FIG. 5. Specifically, common control circuit CC applies a LOW to a register readout lead RRO* which in coincidence with LOW signals on leads RADL*, RST and DTN, turns OFF a register read gate RGRD and, in turn, switches ON gate GREAD, thereby switching a LOW to lead READ*. If either lead RRO* or RADL* is HIGH, the counter-scanner of FIGS. 2 and 4 continues to cycle as priorly described, but lead READ* is held HIGH for switching LOW signals to the leads UCX through UCD and TCX through TCD to prevent readout to the common control CC.

Connection to a Scanning Register

When one of the stations TS11–TS48 goes off-hook to request service, the common control CC locates that station during the sequential scanning of the lines by utilizing the readout contents of the counter-scanner circuit. The common control stops further line scanner pulse generation by activating the register state control circuitry of FIG. 5 when the counter-scanner code corresponds to that of the calling party. Control circuit CC does so by engaging the register through an application of a LOW to lead REN*. Lead REN* LOW in combination with other LOW signals on all of the input leads to gate SZRGL, switches that gate OFF to reset the scan flip-flop SCAN F/F for making lead SCAN* HIGH and thereby inhibiting the clock driver gate CDR of FIG. 4. Lead SZRGL HIGH holds gate SD in FIG. 3 ON to prevent a possible single digit indication to the common control as hereinafter described. Next, the common control CC applies a LOW to lead SM* of FIG. 5 for turning OFF the operate select magnet gate OSM of FIG. 5. When the latter occurs, a HIGH is applied to lead SMLKL to the switching network SN for operating a crossbar switch select magnet in a conventional manner and thereby end marking the register termination in network SN preparatory to the establishment of connections between register RCA and the calling station line.

Figure 3:
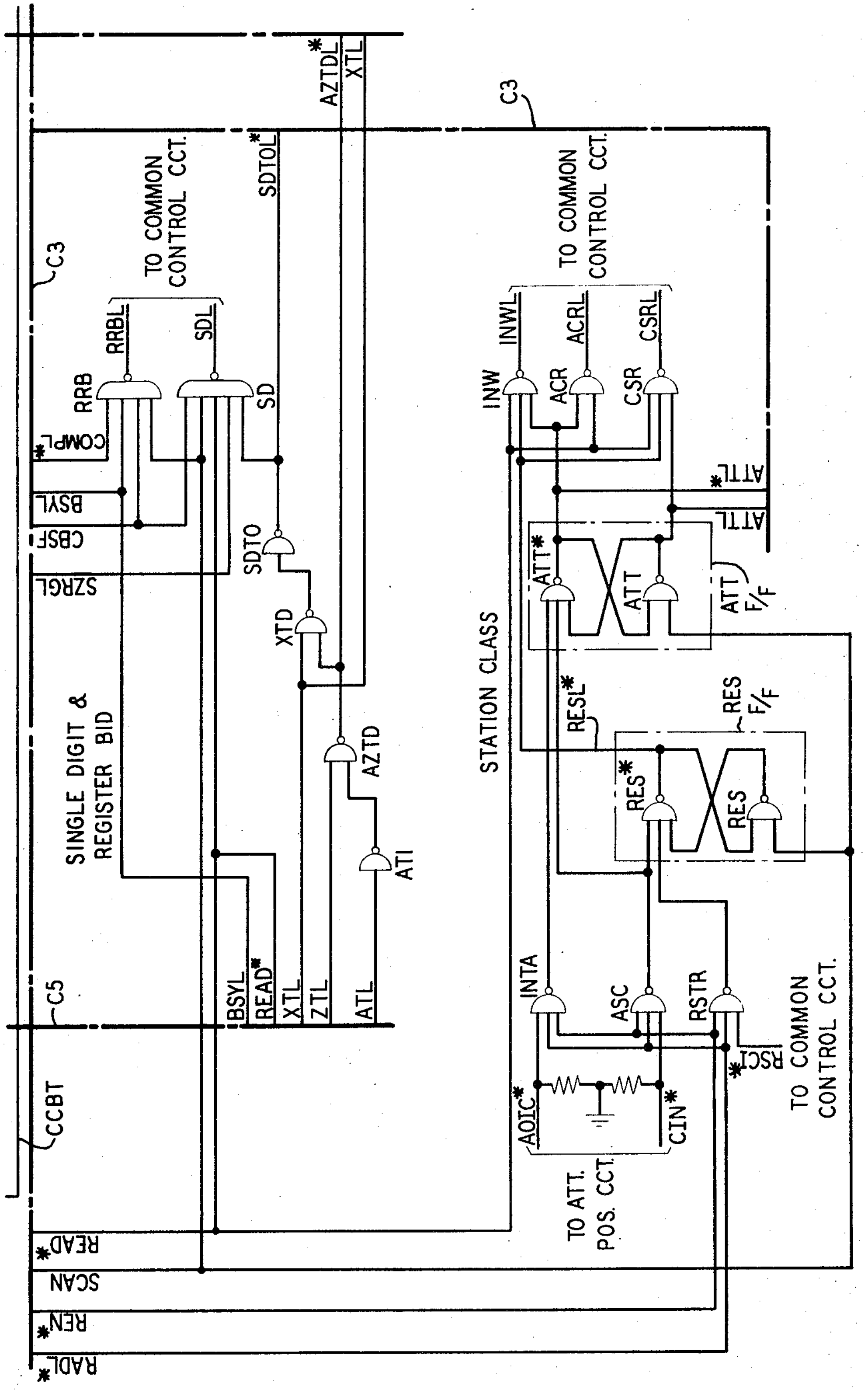
FIG. 3 schematically depicts station class of service circuitry together with a single digit and register bid circuit.

After the foregoing register operations have been completed, the common control circuit ascertains the class-of-service to which the calling station is assigned and then it informs register RCA of that class by operating the station class circuitry of FIG. 3. Three classes of station information are stored in FIG. 3, namely, restricted (for outgoing calls), intercom calls by an attendant, and inward completion calls. The FIG. 3 circuitry is partially prepared for storing the class of the calling station in flip-flops RES F/F and ATT F/F when the scan lead SCAN is switched LOW by flip-flop SCAN F/F as priorly explained. Gates RSTR, ASC and INTA of FIG. 3 receive the class information from the common control CC and/or an attendant position circuit such as circuit APC. These gates are unlocked or enabled when the HIGHS on leads RADL* and REN* are switched LOW as priorly explained by the common control circuit CC. If the station being connected to the register is restricted to local intercom calls to another station or to an operator, the common control makes lead RSCL* LOW to turn OFF the gate RSTR. When the latter action occurs, it sets flip-flop RES F/F to store the restricted class of the calling station. If the station being connected is an attendant, the input lead AOIC* from the attendant position circuit is switched LOW to turn OFF the gate INTA. As a result, the HIGH at the output of this gate sets flip-flop ATT F/F to register that the attendant is the calling party. If an attendant position is attempting to complete a central office trunk call inward to a station, lead CIN* is switched LOW to turn OFF gate ASC which, in turn, sets the flip-flop RES F/F and flip-flop ATT F/F to indicate that the calling party is an attendant attempting to complete an inward call. Following the storage of the station class information the register is in a position to control the further processing of the call through the system.

Dial Tone Connection

Following the operation of the crossbar select magnet associated with register RCA, the common control CC controls the completion of call connections through network SN between the calling one of the stations TS11–TS48 and register RCA via conventional crossbar switch select and hold magnet operations. Network SN is connected to the register tip, ring and sleeve lead RLK, TLK and SLK of FIG. 6. After call connections are completed, the common control CC operates the register RCA to reset the "units" and "-tens" counter-scanners of FIGS. 2 and 4 for counting and registering dialed digits from the calling station. The register thereafter returns dial tone to the calling station as a signal to commence dialing.

The counter-scanner reset process involves the application of a positive reset pulse to the reset lead RST under control of a monopulser RSTA of FIG. 4. The process is initiated after the crossbar switch hold magnet operation and when the common control CC switches lead SM* of FIG. 5 HIGH to turn ON gate OSM and thereby remove the select magnet operate signal on lead SMLK to network SN. The LOW from the gate OSM output also turns OFF gate SMLKI for applying a HIGH to lead SMLK* for triggering the monopulser RSTA which generates a reset pulse on lead RST. The latter lead extends to a plurality of strategic control points in the register including the counters UFC, UTC, TFC and TTC of FIGS. 2 and 4. The reset pulse on this lead resets the FIGS. 2 and 4 counters to the state "*a*" as shown in the foregoing tabulation of counter states. A reset operation is accomplished by the HIGH pulse on lead RST turning ON all but one gate in each of the four counters. For example, in counter UTC of FIG. 4, the reset pulse is applied through diode DRSC to turn ON gates YU and ZU, but it is not applied to gate XU because of the blocking diode DXU. The outputs of gates YU and ZU feed back to the input of gate XU for switching it OFF and establishing the aforementioned stable state "*a*."

Figure 6:
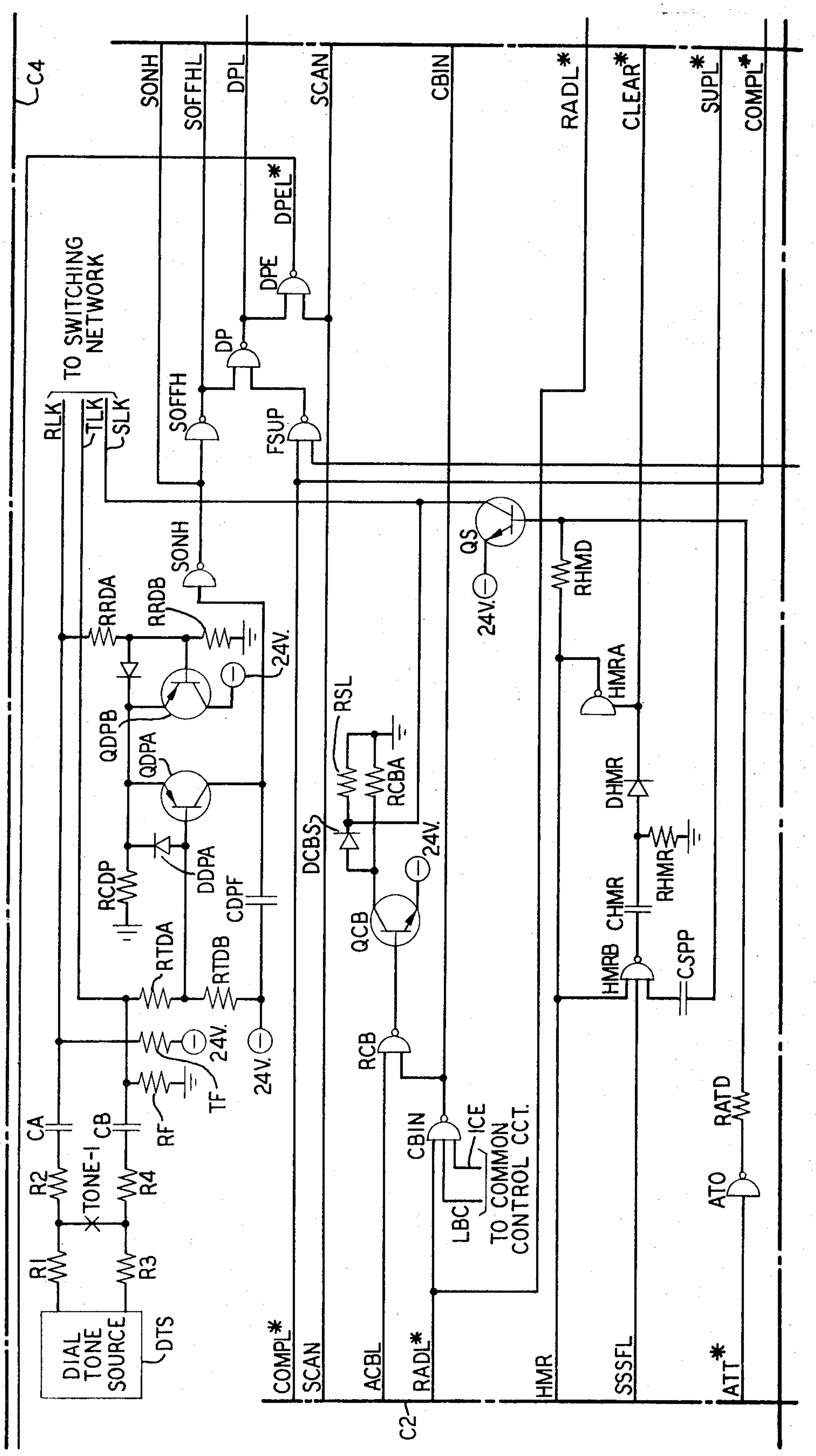
FIG. 6 is a schematic of the detector circuit for supervising call connections through the switching network and detecting dialed pulses, as well as related circuitry for select and hold magnet operations in the crossbar switching network.
Figure 7:
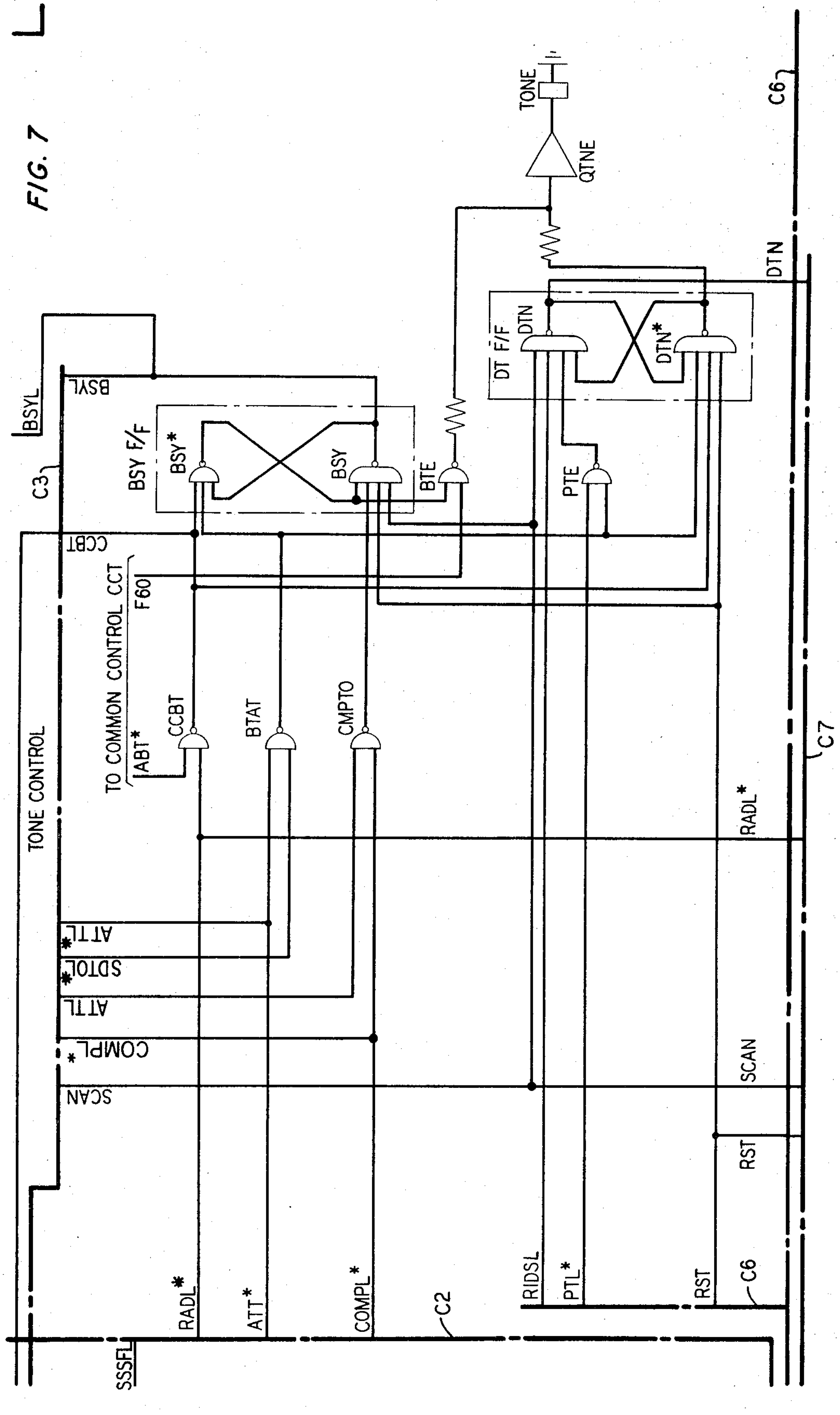
FIG. 7 illustrates dial tone and busy-tone control circuitry.
Figure 8:
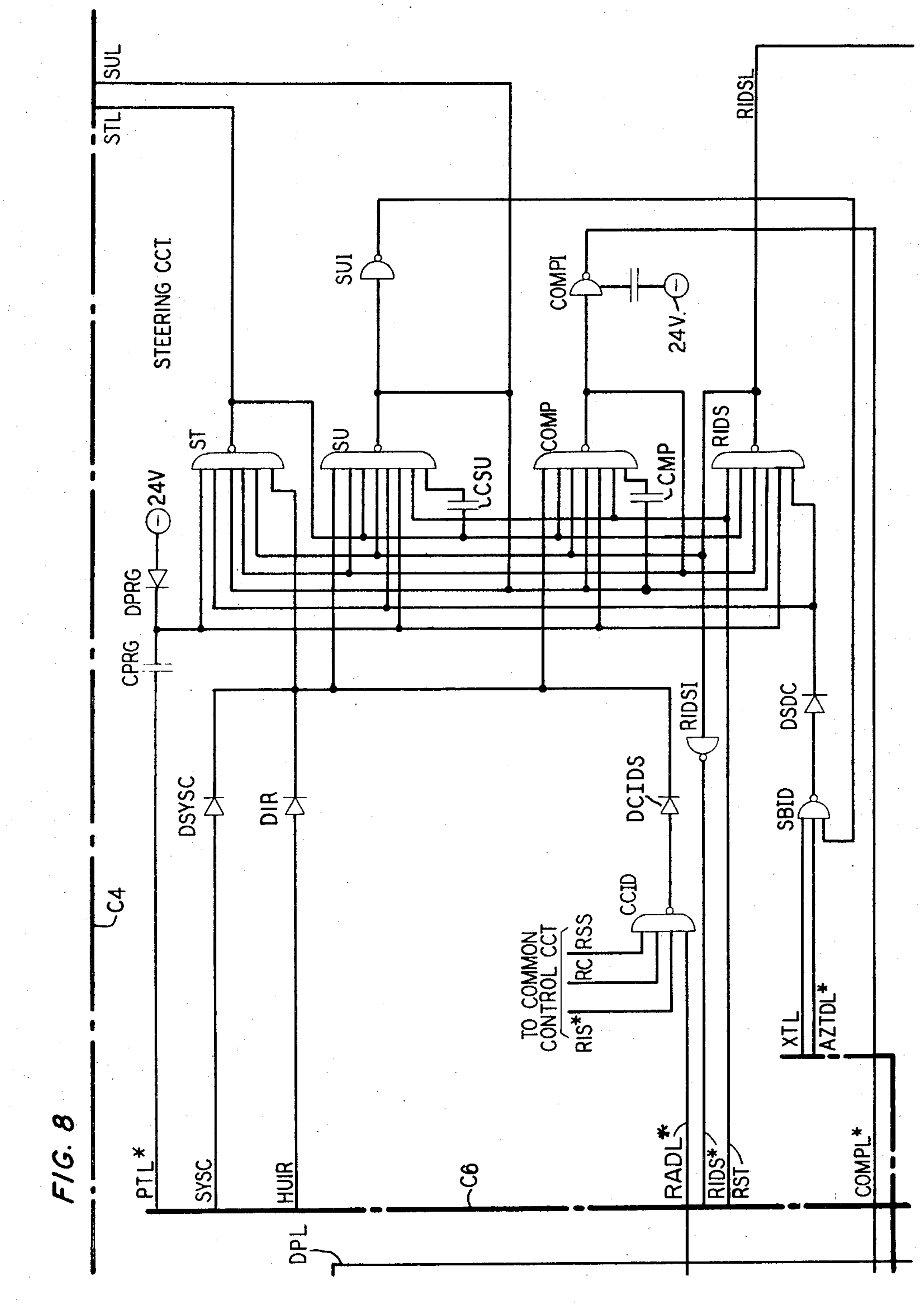
FIG. 8 discloses the steering control circuit.

Dial tone is transmitted to the calling station via network SN from a dial tone source DTS of FIG. 6 via the resistors R1–R4, capacitors CA and CB, and the tip and ring leads RLK and TLK when a TONE relay of FIG. 7 is released. The latter relay is held operated by an amplifier QTNE during the time when dial tone is not to be transmitted. As a result, its contact TONE-1, FIG. 6, is concurrently actuated for providing a shunt path. Relay TONE is released in response to the reset pulse being applied to lead RST as priorly described. The latter pulse sets the dial tone flip-flop DT F/F of FIG. 7 by switching gate DTN* ON which, in turn, switches gate DTN OFF. Gate DTN* ON also applies a LOW to amplifier QTNE and thereby effects the release of relay TONE. Dial tone is then transmitted to the calling party over the priorly traced path and as a signal to begin dialing.

The reset pulse on lead RST also resets the busy tone flip-flop BSY F/F of FIG. 7 by switching gate BSY ON which, in turn, switches gate BSY* OFF. As a result, the HIGH output of gate BSY* is coupled to a busy-tone enable gate BTE of FIG. 7 for switching it ON and thereby holding amplifier QTNE OFF and the relay TONE released.

Another function of the reset pulse on lead RST is to activate the steering circuit of FIG. 8 into a steer "tens" state whereby the first digit to be dialed by the calling party is directed to the "tens" counter-scanner of FIG. 2. In FIG. 8, the reset pulse on lead RST turns ON the gates SU, COMP and RIDS. The outputs of the latter gates feed back to turn OFF the steer "tens" gate ST, the output of which, in turn, holds gates SU, COMP and RIDS ON. When the latter occurs, circuit actions occur to inform the common control that the register is busy and unavailable for line scanning pulse generation or for connection to another party requesting service. Specifically, gate RIDS switches OFF the gate RIDSI of FIG. 8 to apply a HIGH signal to lead RIDS*. The latter signal turns ON gate RIDLE of FIG. 5 which makes the register busy lead RBSYL* to the common control LOW and also switches gate RBSY OFF to make lead RBSYL HIGH to the common control.

The reset pulse on lead RST also controls the inhibiting of the readout gates RXT through RZT and RAT through RDT, RXU through RZU and RAU through RDU of FIGS. 2 and 4. These gates receive a HIGH on lead READ* from gate GREAD of FIG. 5, which is switched OFF by gate RGRD being held ON by the reset pulse on lead RST.

At the termination of the reset pulse, the counter-scanner circuits of FIGS. 2 and 4 are in condition for receiving a dialed number under control of the ON-OFF hook detector circuit of FIG. 6. Dial pulses at this point in the call processing scheme cannot be admitted for counting to FIGS. 2 and 4 circuits because the gates IUFC and ITFC are held ON by a HIGH on a dial pulse enable lead DPEL* from an OFF gate DPE of the FIG. 6 circuitry. As hereinafter described, gate DPE applies a LOW to lead DPEL* in response to each pulse dialed by the calling station.

Call Supervision

Dial pulse detection and call supervision on the tip and ring leads TLK and RLK extending through the network SN is accomplished by the circuitry of FIG. 6. The circuit comprises transistors QDPA and QDPB which are arranged as a differential pair across the leads TLK and RLK. At the time when the register RCA is idle and not involved on a call, leads TLK and RLK are opened and not connected through network SN. Under such conditions, the voltage at the base of transistor QDPB is closer to −24 volts than that of the base of transistor QDPA. Therefore, transistor QDPB is conducting and reverse biases the base emitter junction of transistor QDPA which supplies a LOW to the station on-hook gate SONH of FIG. 6. The output of the latter gate is HIGH for holding ON a station off-hook gate SOFFH during the idle state of the register.

When the tip and ring leads TLK and RLK are connected through network SN to a calling station in an off-hook state, the potential at the base of transistor QDPB rises and the potential at the base of transistor QDPA falls due to the voltage divider comprising resistors RF and TF of FIG. 6 and the off-hook station. Consequently, transistor QDPA conducts and supplies a HIGH to gate SONH to switch it ON. Accordingly, as soon as connections through network SN are cut through following the crossbar switch hold magnet operations as priorly explained the gate SONH switches ON and in turn switches gate SOFFH OFF to apply a HIGH to lead SOFFHL. In turn, the latter HIGH switches a dial pulse detector gate DP ON to apply a LOW on lead DPL which extends to the call supervision circuit of FIG. 9. Transistor QSUP of FIG. 9 turns OFF in response to the LOW on lead DPL and in doing so applies a HIGH to lead SUPL and a LOW to lead SUPL*. Lead DPL LOW also turns OFF a dial pulse gate DPI for holding ON a dial pulse supervision gate SDP of FIG. 9. Gate SDP holds transistor QPT OFF for holding a pulse-train gate PT ON which, in turn, holds its complement gate PT* OFF for maintaining a HIGH on lead PTL*. The register circuit thereafter rests in this state awaiting a receipt of a dialed pulse from the calling station.

Dial Pulse Counting and Registration

When the calling customer operates the rotary dial of his station set, a series of dial pulses is generated on the station loop connected to leads TLK and RLK of FIG. 6. When the loop opens on a dial pulse, the base of transistor QDPA rises toward ground for switching the transistor OFF and, in turn, switching gate SONH OFF. Gate SONH OFF turns ON the gate SOFFH which, in turn, switches the dial pulse gate DP OFF and makes lead DPL HIGH. When the latter occurs, the dial pulse enable gate DPE switches ON and causes all inputs of gate ITFC of FIG. 2 to be LOW for causing that gate to switch OFF. As a result, a pulse is coupled through the capacitor CTFC to the "tens" four-counter of FIG. 2 for advancing that counter one state in a manner as priorly described. At the end of the dial pulse, the station loop is reclosed and transistor QDPA again switches ON for, in turn, switching gate SONH ON and results in lead DPEL* being switched HIGH as priorly described. The latter action turns ON gate ITFC of FIG. 2 for discharging capacitor CTFC in preparation for the next pulse. On each subsequent dial pulse, lead DPE* is switched LOW as already described and gate ITFC switches OFF to advance the counter one state.

Figure 9:
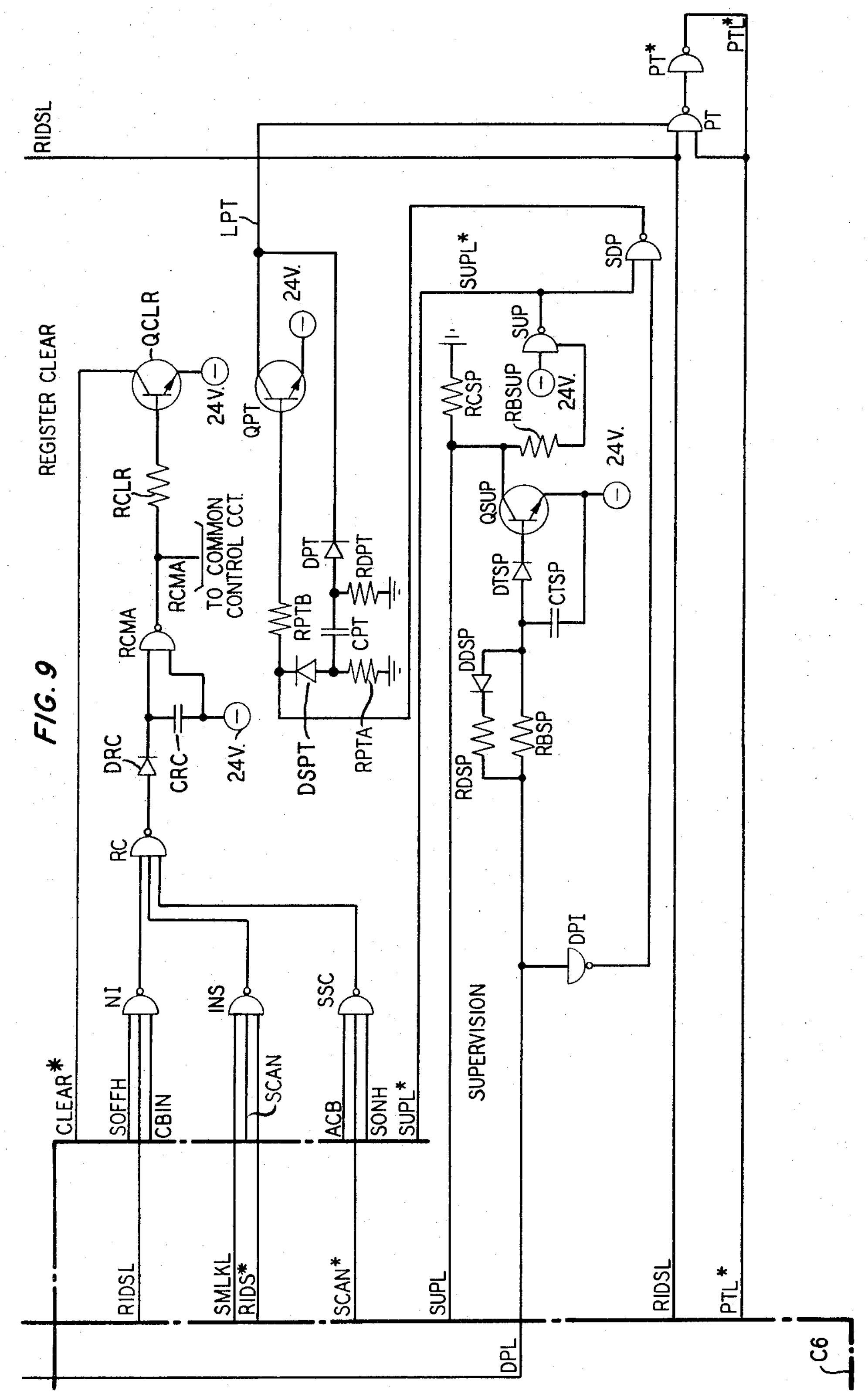
FIG. 9 shows supervision circuitry embodying a pulse train detector and circuitry for clearing a register of call data.

Upon receipt of a first dialed pulse, register RCA is equipped to interrupt the transmission of dial tone from source DTS of FIG. 6 to the calling station via network SN. Dial tone transmission, as previously explained, is controlled by relay TONE of FIG. 7. Prior to a receipt of the first dialed pulse, relay TONE is released as already described. Dial tone interruption results from the reoperation of relay TONE by the following circuit actions. When gate DP switches lead DPL HIGH on the first dialed pulse, gate DPI of FIG. 9 is activated for switching gate SDP OFF and applying a HIGH through resistor RPTB to the base of transistor QPT for switching it ON. As a consequence, gate PT switches OFF for, in turn, switching gate PT* ON and applying a LOW to lead PTL*. The latter signal switches gate PTE of FIG. 7 OFF which results in gate DTN turning ON for turning gate DTN* OFF and driving amplifier QTNE to reoperate relay TONE. In reoperating, relay TONE recloses its contact TONE-1 to interrupt the transmission of dial tone from source DTS to the calling station.

Pulse Train Detector

The circuitry of FIG. 9 is utilized to detect a train of dial pulses corresponding initially to a dialed "tens" digit and then a "units" digit. Following a receipt of a "tens" digit, the FIG. 9 circuitry activates the steering circuit of FIG. 8 for switching the counters of FIGS. 2 and 4 from a count "tens" to a count "units" state. After a pulse train for the "units" digit, the circuitry of FIG. 9 further operates the steering circuit to advance it to a dialing completed state.

When lead DPL is switched HIGH as priorly explained on the first dialed pulse, capacitor CTSP in the timing circuit of FIG. 9 begins to charge through resistor RBSP. The timing network formed by capacitor CTSP and resistor RBSP is arranged to guarantee that transistor QSUP does not turn ON before a dial pulse ends and the lead DPL returns LOW. When lead DPL is switched LOW, capacitor CTSP discharges rapidly through the diode DDSP, resistor RDSP and the collector electrode of the transistor in gate DP. Thus, a change in supervision does not occur on the leads SUPL and SUPL* for dialing. Lead SUPL remains HIGH and lead SUPL* remains LOW during dial pulsing to indicate that a station is still connected to register RCA.

A pulse train circuit including a transistor QPT and a network including capacitor CPT, resistors RPTA and RDPT, and diode DPT are employed for detecting a pulse train and precluding the switching of gate PT during interpulse intervals of the "tens" digit. Transistor QPT is normally held OFF by gate SDP and its output is normally HIGH when no digits are being received. As a result, capacitor CPT is charged through resistor RDPT and diode DSPT. The circuit in this state holds gate PT ON prior to the receipt of a first dial pulse.

When lead DPL is switched HIGH as priorly described on the first dialed pulse of a "tens" digit, it switches gate DPI of FIG. 9 ON. As a result, both inputs to gate SDP are then LOW for switching it OFF and its output HIGH. The latter signal causes transistor QPT of FIG. 9 to turn ON during a loop open condition of a dial pulse and to turn OFF during the immediately succeeding interpulse interval. The output of transistor QPT on lead LPT does not, however, switch HIGH during the interpulse interval. The latter signal then indicates that dialing of the first digit has been completed.

Storage of "Units" Digit Pulses an Completion of Dialing

At the end of the "tens" digit pulse train, the steering circuit of FIG. 8 is advanced to a steer "units" state in which gate SU is switched OFF and gates ST, COMP and RIDS are switched ON. As a result, the counter-scanners of FIGS. 2 and 4 are conditioned for counting a dialed "units" digit in the "units" counter-scanner of FIG. 4.

When gate PT is switched ON at the end of the first digit as priorly described, gate PT* turns OFF to cause a short pulse to be coupled through capacitor CPRG of FIG. 8 for turning ON the gates ST, SU, COMP and RIDS in the steering circuit of FIG. 8. Since the steering circuit had been in the steer "tens" state, the capacitor CSU was charged to a voltage determined by a collector resistor of gate ST and the resistance driven by gate ST. Because capacitor CSU is initially charged, the short input pulse causes the capacitor voltage at the input of gate SU to go a few volts below −24 volts. The time duration of the input pulse is shorter than the charging time of capacitor CSU such that the voltage input to gate SU is slightly below −24 volts when the input pulse is terminated. This causes gate SU to turn OFF and hold gates ST, COMP and RIDS ON. The steering circuit of FIG. 8 is thus advanced to a steer "units" state.

The steer "units" state corresponds to lead SUL HIGH and lead STL, COMPL and RIDSL LOW. Lead SUL HIGH holds gate ITFC of FIG. 2 ON to inhibit further dial pulsing into the "tens" counter-scanner circuit of FIG. 2. Lead STL LOW enables gate IUFC of FIG. 4 such that when a second digit is dialed the pulses appearing on lead DPEL* advances the "units" counter in much the same fashion as already described with respect to the "tens" counter-scanner of FIG. 2. Lead PT* goes LOW at the beginning of a pulse train and remains LOW for its duration as priorly described. At the end of the "units" digit, gate PT* turns OFF and a pulse is coupled through capacitor CPRG of FIG. 8 for advancing the steering circuit to the dialing completed state. This corresponds to gate COMP OFF and gates ST, SU and RIDS ON. Since the steering circuit had been in the steer "units" state, a capacitor CMP of FIG. 8 was charged to a voltage determined by a collector resistor of gate SU and the resistance driven by gate SU. Because capacitor CMP is initially charged, a short input pulse coupled from gate PT* through capacitor CPRG to gates ST, SU, COMP and RIDS at the end of the "units" digit causes the capacitor voltage at the input to gate COMP to go a few volts below −24 volts. The time duration of the input pulse is shorter than the charging time of capacitor CMP such that the voltage input to gate COMP is slightly below −24 volts when the input pulse is terminated. This causes gate COMP to turn OFF and hold ON gates ST, SU and RIDS. The steering circuit then is advanced into its dialing completed state. Gate COMP OFF holds gate COMPI ON and results in a LOW on lead COMPL*. Inasmuch as the register is not then applying a busy tone, leads BSYL and COMPL* are coincidentally LOW for turning OFF gate FSUP of FIG. 6 which turns ON gate DP. This prevents further dial pulse repeating on lead DPL and also makes lead DPEL* HIGH to inhibit further advances of either the "tens" or "units" counter-scanners of FIGS. 2 and 4.

Dialed One and Two Digit Codes

In the illustrative embodiment, the register is equipped to advance the steering circuit of FIG. 8 to its dialing completed state after a receipt of a dialed "-tens" digit other than a one, two, three or four. Such an advance is utilized, for example, on single digit calls from stations TS11–TS48 to an operator. For implementing such an advance, a single digit and register bid circuit is provided in FIG. 3. The circuit is connected over three leads, ATL, ZTL and XTL to the "tens" counter-scanner of FIG. 2. Lead ATL is connected to the output of the gate in the first stage (AT) of the "-tens" four-counter TFC. Leads ZTL and XTL are connected to the outputs of the gates in the last and first stages (ZT and XT) respectively of the "tens" three-counter TTC.

If the calling customer dials any number but 1, 2, or 3 as the first digit, a LOW will be applied to the XT output of the "tens" three-counter TTC. If a 4 is dialed as the first digit, the ATL lead of the "tens" four-counter will have a HIGH applied thereto and the ZTL lead will also have a LOW applied thereto so that gate AZTD is switched OFF to make lead AZTDL* HIGH. If any of the digits 5 through 0 is dialed, either lead ATL will be LOW to turn OFF gate ATI or the lead ZTL will be HIGH. Either of these conditions result in a LOW on lead AZTDL*. Accordingly, at the completion of the "-tens" digit registration, gate SU of FIG. 8 will be OFF as priorly explained and will, in turn, turn ON the gate SUI of FIG. 8 for applying a LOW to the input of gate SBID of FIG. 8. If any of the digits 5 through 0 has been dialed, all inputs to gate SBID will be LOW. Gate SBID then switched OFF to forward bias diode DSDC of FIG. 8 for turning ON gates ST, SU and RIDS and causing gate COMP to be turned OFF by the outputs of gates ST, SU and RIDS. The steering circuit of FIG. 8 is now in the dialing completed state as priorly discussed. In this state, lead COMPL* is switched LOW under control of the associated gate COMPI for turning OFF a read register bid gate RRB of FIG. 3 and thereby applying a HIGH to lead RRBL as a request for service by the common control circuit CC.

If any of the numbers 1, 2, 3 or 4 is dialed as the "-tens" digit, gate SBID of FIG. 8 does not turn OFF following the operation of gate SUI and the steering circuit does not advance to the dialing completed state until the calling station dials a "units" digit. When the steering circuit advances into the dialing completed state, as priorly described, following the dialing of the "units" digit, gate RRB of FIG. 3 is switched OFF for applying a HIGH to lead RRBL as a bid for service by the common control CC.

Readout of Register Counter-Scanners

If the common control CC is idle, it responds to the register bid by activating the register state control circuit of FIG. 5. Specifically, it applies LOWS to the register address lead RADL* and the register read lead RRO* for switching OFF the register read gate RGRD of FIG. 5. In turn, gate RGRD switches ON the read gate GREAD for applying a LOW to lead READ*. In response to the latter signal, the register will pass the dialed code of the called station together with the class-of-service of the calling station to the common control CC. As priorly explained, lead READ* is held HIGH during the time when readout is not effective from the counter-scanners of FIGS. 2 and 4. Accordingly, all of the "units" and "tens" readout gates URG and TRG are held ON for the nonreadout operation. When the lead READ* is switched LOW following the completion of dialing, the outputs of the "units" and "tens" counter-scanners activate the "units" and "tens" readout gates in accordance with the registered code dialed from the calling station and for the purpose of passing that code to the common control CC.

Calling station class information is stored in the register RCA as priorly explained in the station class circuitry including the flip-flops RES F/F and ATT F/F of FIG. 3. When lead READ* is switched LOW, the class-of-service of the calling station, i.e., restricted, intercom by an attendant or attendant completed inward call, is read out of register RCA into the common control CC via gates CSR, ACR and INW. The latter gates are normally held ON due to a HIGH on lead READ* for a nonreadout of class information. When lead READ* is switched LOW, one of the three gates is enabled in accordance with the operated state of the associated flip-flops RES F/F and/or ATT F/F and for passing the registered station class data to the common control CC.

Register RCA is further equipped to send single digit code information to the common control when a single digit has been dialed by the calling station. Such information is passed to the circuit CC under control of a single digit gate SD of FIG. 3 which is normally held ON by a HIGH on lead READ* for nonreadout operations. When the latter lead is switched LOW and a single digit code as dialed by the calling station corresponds to any of the digits 5 through 0, leads AZTD* and XTL are LOW to turn OFF gate XTD as priorly explained. Gate XTD OFF, in turn, switches gate SDTO ON which when lead READ* is also LOW, turns OFF gate SD to signal the common control that the dialed number is a single digit code.

Callback and Release of Network Connections

After the common control CC has received the called number, class information and single digit information, it decodes the received number and in response thereto determines and selects an appropriate one of the central office or intercom trunk circuits needed to complete the call. Before the common control CC is able to effect a connection between the calling line circuit and the selected trunk circuit, it is necessary to determine the address of the line circuit and to disconnect it from the register. At this stage of the call, the address of the line circuit connected to the register is not stored any place in the system. As a result, the exemplary system obtains it by a callback process which includes first marking the calling line circuit and then scanning the line circuits to identify the address of the marked circuit. The address is required at this juncture of the call so that the calling station can be released from the network connections to the register RCA and thereafter be connected to the selected trunk circuit.

After the trunk circuit selection has been completed as already explained, the common control CC instructs the register RCA to initiate a callback of the calling station. This results in the marking of the sleeve lead SLK of FIG. 6 which extends back through the network SN to the calling line circuit for marking it for address identification during a callback line scanning operation. The register causes the callback sleeve marking by switching the potential on lead SLK from a HIGH, for example, at approximately −18 volts to a more position potential, for example, −10 volts in a known manner and via the network SN sleeve lead path to the calling line circuit. The callback voltage on the sleeve lead path advantageously operates the calling line circuit to mark it as the called back circuit. The operations of the line circuit suitable for use in this illustrative system is disclosed in the copending patent applications of W. W. Greason III — D. W. Weiner, Ser. No. 100,314, filed Dec. 21, 1970, entitled Communication Line Circuitry and Ser. No. 100,315, filed Dec. 21, 1970 entitled Line Hunting Circuitry.

Callback operations are initiated when the common control switches lead CBS* LOW for turning OFF a callback gate ACB of FIG. 5. Gate ACB OFF produces a HIGH on lead ACBL to set flip-flop SCAN F/F and thereby make lead SCAN* LOW and lead SCAN HIGH. Lead SCAN* LOW enables the clock driver gate CDR of FIG. 4 to cause clock pulses from the common control to drive gate CDR. Lead SCAN HIGH turns ON the dial pulse enable gate DPE of FIG. 6 to make lead DPEL* LOW. As a result, gate IUFC of FIG. 4 is enabled to be driven by clock pulses from driver gate CDR for cycling the "units" and "tens" counter-scanners of FIGS. 2 and 4 to generate callback line scanning codes at their outputs in essentially the same manner as hereinbefore described with respect to service request line scanning. When the callback line scanning code pulses are being generated, lead READ* is LOW for enabling the pulses to be propagated through the "units" and "tens" readout gates URG and TRG to the common control for line scanning.

The callback marking potential is applied to lead SLK of FIG. 6 under control of transistor QCB of FIG. 6. Normal call supervision for the holding of call connections through network SN is effected under control of transistor QCB being held ON together with transistor QS OFF, FIG. 6, and thereby applying a HIGH (−16 volts) to lead SLK. Transistor QCB is switched off in response to gate RCB of FIG. 6 being turned ON by a HIGH on lead ACBL under control of circuit CC. Transistor QCB OFF allows diode DCBS of FIG. 6 to be forward biased for lowering the output impedance of the register sleeve lead SLK by paralleling the resistors RCBA and RSL. As a result, the voltage to the calling line circuit is raised more positive than −16 volts to mark the line circuit for location by the common control CC during callback line scanning operations.

When the code of the counter-scanners of FIGS. 2 and 4 corresponds to that of the called back station, control circuit CC makes the callback station found lead CBSF of FIG. 5 HIGH to turn ON gate ACB and, in turn, to switch gate RCB of FIG. 6 OFF and transistor QCB ON to remove the callback signal applied by the register to lead SLK. Lead CBSF HIGH also turns ON gates SD and RRB of FIG. 3 to remove the single digit and register bid indications to the common control circuit. The common control CC also makes lead CBSF* LOW for switching OFF the stop-scanning station found gate SSSF and resetting flip-flop SCAN F/F. On resetting, the latter flip-flop makes leads SCAN* HIGH to stop callback line scanner pulse generation by inhibiting the gate CDR of FIG. 4. In turning OFF, gate SSSF makes lead SSSFL HIGH to turn ON the HOLD magnet release gate HMRB of FIG. 6. Gates HMRA and HMRB comprise a monopulser circuit such that when gate HMRB turns ON a positive pulse is generated on lead HMR for turning ON transistor QS to reduce the sleeve lead SLK potential to approximately −24 volts. The latter action removes the drive from the sleeve lead and effects the release of the calling party HOLD magnet to open the tip, ring, and sleeve connection through network SN to register RCA. The calling party line circuit is held engaged on the call by the common control readout of the register counter-scanners of FIGS. 2 and 4.

Register Idling

After register RCA releases the calling station HOLD magnet, the common control completes call connections, returns it to its idle state and generates a LOW pulse on lead RIS* of FIG. 8. At the same time the leads RC and RSS of FIG. 8 are LOW and, therefore, gate CCID of FIG. 8 is switched OFF to generate a HIGH pulse which turns ON gates ST, SU and COMP to switch the steering circuit into its idle service-request line scanning state. When gates ST, SU and COMP switch ON all inputs to gate RIDS are LOW resulting in a HIGH on the register idle scan lead RIDSL.

When gate COMP switches on, it turns OFF gate COMPI which, in turn, switches ON gate FSUP of FIG. 6 for allowing the detector circuit of FIG. 6 and the supervision circuitry of FIG. 9 to determine that the tip and ring leads TLK and RLK are open. With these leads open, transistor QDPA and gate SONH of FIG. 6 switch OFF and hold the station off-hook gate SOFFH ON. As a result, the dial pulse gate DP turns OFF to begin the charging of capacitor CTSP in the supervision circuit of FIG. 9. After capacitor CTSP has charged sufficiently, it allows transistor QSUP to switch ON, making lead SUPL LOW and turning OFF gate SUP of FIG. 9 for applying a HIGH to lead SUPL* which is reflected as a pulse through capacitor CSPP of FIG. 6 which triggers the monopulser comprising gate HMRB and HMRA of FIG. 6. Concurrently, the common control CC releases from the register connection and becomes idle, but the register is made to appear busy to the common control by the HIGH on lead SUP holding the register idle gate RIDLE of FIG. 5 ON for applying a LOW to the register busy lead RBSY* and a HIGH to lead RBSYL via gate RBSY. Accordingly, register RCA appears busy from the time the common control goes idle and the common control does not read out the counter-scanners of FIGS. 2 and 4. As a result, either lead RADL* OR RRO* is HIGH from the common control circuit of FIG. 5 for holding ON the gate RGRD. When ON, gate RGRD enables the pulse on lead HMR through gate HMRI and the idle register gate IR of FIG. 5 to set the scan flip-flop SCAN F/F. When the latter occurs, a LOW appears on lead SCAN* for enabling the clock driver gate CDR of FIG. 4 and causing the counter-scanner circuits of FIGS. 2 and 4 to begin cycling to generate service request line scanning codes. Concurrently, lead SCAN is HIGH for holding the flip-flops RES F/F, ATT F/F, BSY F/F, and the DT F/F reset. The pulse on the HOLD magnet release lead HMR holds gate RIDLE ON to maintain the busy indication to the common control CC while the register is in the process of becoming idle. Upon the termination of the latter pulse, the register rests in its idle condition and generates service line scanning pulses under control of the counter-scanners of FIGS. 2 and 4.

It is to be understood that the hereinbefore described arrangements are illustrative of the application of the principles of our invention. In light of this teaching, it is apparent that numerous other arrangements may be devised by those skilled in the art without departing from the spirit and scope of the invention.

What is claimed is:

1. In a common control communications switching system having a plurality of stations, a source of clock pulses, and a counter capable of generating a distinctive coded output signal corresponding to each of said stations, a method of establishing connections from a service requesting one of said stations to a called one of said stations comprising the steps of 1. coupling said clock pulse source to said counter to cause said counter sequentially to generate said distinctive coded output signals,
2. coupling said distinctive coded output signals one at a time to said common control to cause said common control to interrogate each of said stations corresponding to said output signals for a service request,
3. resetting said counter upon a service requesting one of said stations being detected,
4. applying dial pulse signals from said service requesting one of said stations to said counter to advance said counter directly to produce an output signal corresponding to a called one of said stations,
5. establishing a communications connection to said called one of said stations,
6. recoupling said source of clock pulses to said counter for causing said counter sequentially to generate said distinctive coded output signals,
7. recoupling said distinctive coded output signals one at a time to said common control to cause said common control to redetect said service requesting one of said stations, and
8. extending said communications connection from said called one of said stations to said service requesting one of said stations.

2. A counter-scanner circuit for a switching system having
 a common control,
 a switching network,
 a plurality of stations, and
 a source of clock pulses,
 said counter-scanner circuit comprising
  a counter capable of generating a distinctive coded output signal corresponding to each of said stations,
  means operable by said common control for coupling said clock pulse source to said counter to cause said counter to generate sequentially said distinctive coded output signals,
  means for applying said distinctive coded output signals one at a time to said common control to cause said common control to interrogate for a service request each of said stations corresponding to said output signals,
  means controlled by said common control upon interrogating a service requesting one of said stations for resetting said counter,
  means for transmitting dial pulse signals from said service requesting one of said stations to said reset counter to advance said counter directly to produce an output signal corresponding to a called one of said stations, said common control thereupon establishing a communications connection in said network to said called one of said stations, and
  means activated by said common control for reoperating said coupling means to cause said counter to generate said distinctive coded output signals, said applying means applying said distinctive coded signals to said common control to cause said common control to redetect said service requesting one of said stations, said common control thereupon extending communications connections from said called one of said stations to said service requesting one of said stations.

3. A counter-scanner circuit in accordance with claim 2 wherein
 said counter comprises a units and a tens digit counter,
 said coupling means includes gate means for applying clock pulses from said clock pulse source to said counter to activate said units digit counter for generating units digit signals of said distinctive coded output signals for service request interrogation of said stations,
 means responsive to prescribed units digit signals generated by said units digit counter for activating said tens digit counter to generate tens digit signals of said distinctive coded output signals, and
 means responsive to a receipt of a service request from one of said stations for disabling said gate means to block said clock pulses from being applied to said counter.

4. A counter-scanner circuit in accordance with claim 3 wherein
 said tens digit counter comprises an input gate for receiving said prescribed units digit signals and said dial pulse signals,
 said units digit counter comprises an input gate for receiving said clock pulses and said dial pulse signals, and
 said counter-scanner circuit further includes steering means for gating received tens digit dial pulse signals to said tens digit counter input gate and received units digit dial pulse signals to said units digit counter input gate for counting and registering said units and said tens digit dial pulse signals.

5. A counter-scanner circuit in accordance with claim 4 further comprising a pulse train detector responsive to a receipt of said tens and said units digit dial pulse signals for controlling said gate means to apply clock pulses to said units digit counter for generating distinctive coded output signals for callback scanning of said stations 6. In a telephone system having
 common control means,
 a plurality of station lines having units and tens digit address codes, and
 a source of clock pulses,
 the improvement comprising
  a register circuit having a units and a tens digit counter,
  a register state control circuit including means controlled by said common control means for enabling said units and said tens digit counter to generate units and tens digit address codes of said lines, means responsive to a receipt of clock pulses from said clock pulse source for advancing said units digit counter to generate said units digit address codes, means responsive to a receipt of generated units digit address codes for advancing said tens digit counter to generate tens digit address codes, said common control means being responsive to said units and said tens digit address codes generated by said counters for scanning said lines for call service requests, and being further responsive to a detection of a service request from a scanned one of said lines for controlling the establishment of call connections between said register circuit and said one of said lines, means activated by said common control means for resetting said units and said tens digit counter, means activated by said common control means for advancing said units and said tens digit counter in response to dial pulses received from said one of said lines over said established connections, and means controlled by said common control means for applying a callback potential to said established connections to mark said one of said lines for callback scanning, said common control thereupon controlling said enabling means to enable said units and tens digit counters, said units digit counter advancing means and said tens digit counter advancing means subsequently advancing said units digit and said tens digit counter to provide tens and units digit address codes to said common control for scanning said lines to detect said callback potential.

* * * * *